UNITED STATES PATENT OFFICE.

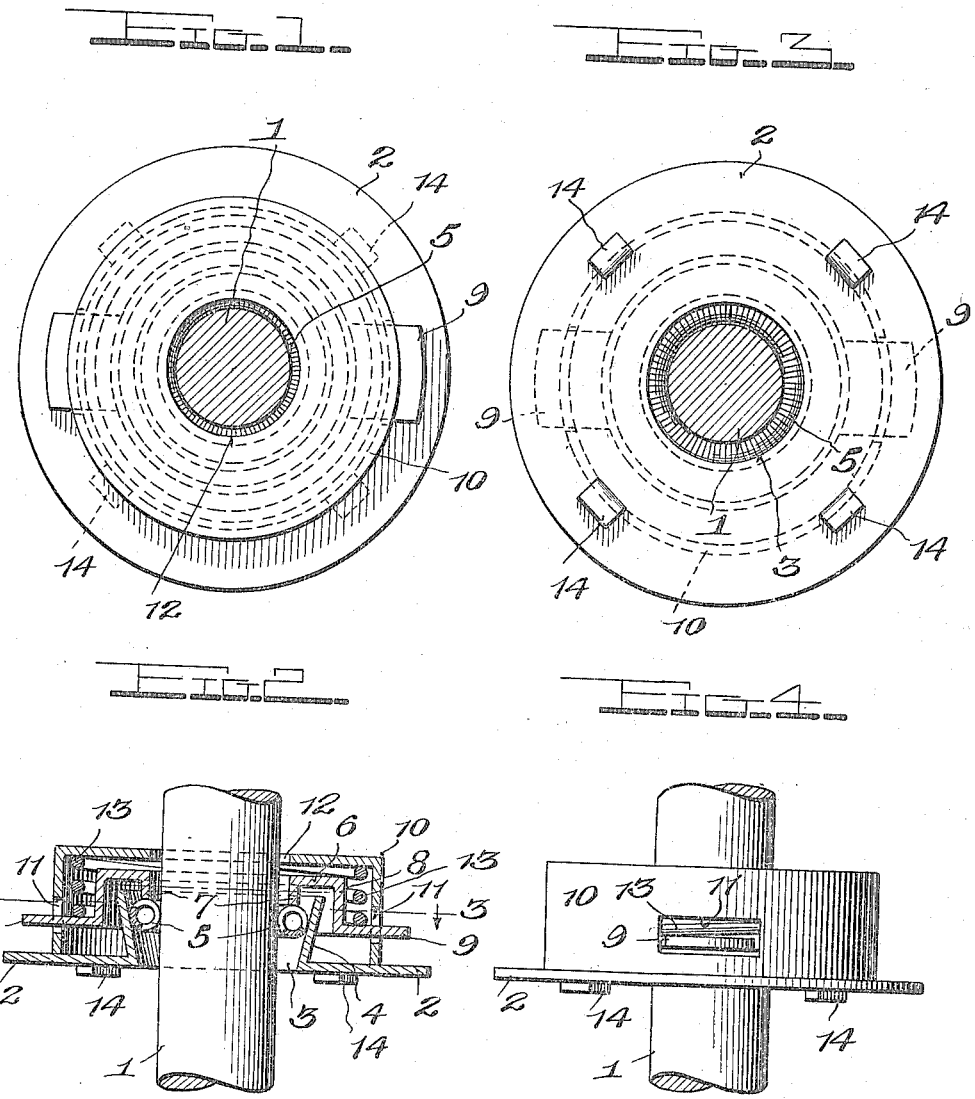

JOHN SCHADE, OF HOLYOKE, MASSACHUSETTS, ASSIGNOR TO NATIONAL BLANK BOOK CO., OF HOLYOKE, MASSACHUSETTS, A VOLUNTARY TRUST ASSOCIATION OF COPARTNERSHIP HAVING AS TRUSTEES J. W. TOWNE, F. B. TOWNE, E. S. TOWNE, J. M. TOWNE, AND F. W. WILSON.

FRICTION-CLUTCH DEVICE FOR TELESCOPING ELEMENTS.

1,270,976.  Specification of Letters Patent.  Patented July 2, 1918.

Original application filed December 26, 1916, Serial No. 138,846. Divided and this application filed July 31, 1917. Serial No. 183,789.

*To all whom it may concern:*

Be it known that I, JOHN SCHADE, a citizen of the United States, residing at Holyoke, in the county of Hampden, State of Massachusetts, have invented certain new and useful Improvements in Friction-Clutch Devices for Telescoping Elements; and I do declare the following to be a full, clear, and exact description of the invention, such as will enable others skilled in the art to which it appertains to make and use the same.

This invention relates to certain new and useful improvement in a friction clutch device for telescoping elements, the same being a division of my pending application filed Dec. 26, 1916, Serial No. 138,846, and it has for one of its principal objects to provide a clutch part carried by the female part and adapted to be contracted about the male part for securely gripping the latter.

Further, the invention resides in a sheet metal construction which embodies a base plate having a flared shell within which a contractible coiled clutch ring is arranged for being moved into the smaller end thereof to contract it against the male element passed through the shell.

The invention further resides in the features of construction hereinafter described and claimed, reference being had thereto in the accompanying drawing wherein—

Figure 1 is a top plan view of the clutch device as constructed in accordance with the present invention;

Fig. 2 is a vertical section thereof;

Fig. 3 is a horizontal section on line 3—3 of Fig. 2; and

Fig. 4 is a side elevation of the friction clutch device.

Referring more in detail to the drawing, the numeral 1 designates the male member and 2 the female member, the latter comprising a base plate formed with a central opening 3 and an integral and annular shell or wall 4 that flares upwardly from the edge of the opening.

An expansible and contractible clutch 5 is disposed within the tapering shell 4 and comprises a coiled spring wound open so that when the ends of the spring are secured together to form a ring, the normal tendency of the coiled ring will be to expand and move upwardly into the larger or wider end of the shell. Consequently, if the clutch ring is moved downwardly in the tapering shell from its normal position in the larger end thereof, said clutch will be contracted about the male member for securely and frictionally holding the same.

A follower 6 is provided for moving the clutch to operative position and embodies a top wall having inner and outer concentric walls 7 and 8 that receive the upper edge of the shell therebetween. The inner wall 7 rests on the clutch ring and serves to move the same down into the smaller end of the shell. The outer wall 8 is formed on its lower edge with diametrically opposite finger lifts 9, extending radially therefrom.

A box-like casing 10 incloses the follower, and this comprises a cylindrical wall, formed with diametrically opposite vertical slots 11 through which lifts 9 project for vertical movement, and a top wall provided with a central opening 12 through which the rod or male member 1 passes. This casing incloses a coiled expansion spring 13 which encircles the follower wall 8 and seats on the lifts 9, at the same time bearing upwardly on the top wall of the casing. Depending from the lower opened edge of the casing is a plurality of spurs or lugs 14 which are passed through perforations in the base plate and clenched against the under face thereof to serve as a means for fastening the casing to the plate.

In operation, the male member is passed upwardly through the clutch ring which latter frictionally engages the former and prevents withdrawal thereof by reason of the spring-pressed follower wedging the clutch ring down between the contracted end of the shell and the rod. To release the rod, the follower is lifted by pulling upwardly on the protruding finger lifts 9, so as to relieve the clutch ring from pressure. When thus relieved the ring will expand, riding up the flared interior of the shell.

The device is readily and economically manufactured by simply stamping the parts from sheet metal or otherwise forming the same.

This invention is especially adapted for top lock or ledger leaf binders, desk spikes, curtain rods and other devices in which one element telescopes another.

What is claimed is:

1. In a friction clutch, a male member and a female member, said female member comprising a base plate having an opening to receive the male member and an integral annular shell flaring upwardly from the edge of the plate opening, a contractible clutch element normally in the larger end of the shell and adapted to be wedged into the smaller end thereof between the shell and male member, a follower for operatively disposing the clutch resting on the latter and inclosing the upper edge of the shell, outwardly extending finger lifts on the follower, and means supported by the lifts for urging the follower toward the clutch.

2. In a friction clutch, a male member and a female member, said female member comprising a base plate having an opening to receive the male member and an integral annular shell flaring upwardly from the edge of the plate opening, a contractible clutch element normally in the larger end of the shell and adapted to be wedged into the smaller end thereof between the shell and male member, a follower for operatively disposing the clutch resting on the latter and inclosing the upper edge of the shell, outwardly extending finger lifts on the follower, a coiled spring seating on the lifts for yieldably urging the follower toward the smaller end of the shell, and a casing inclosing the spring and follower.

3. In a friction clutch, a male member and a female member, said female member comprising a base plate having an opening to receive the male member and an integral annular shell flaring upwardly from the edge of the plate opening, a contractible clutch element normally in the larger end of the shell and adapted to be wedged into the smaller end thereof between the shell and male member, a follower for operatively disposing the clutch resting on the latter and inclosing the upper edge of the shell, outwardly extending finger lifts on the follower, and resilient means bearing downwardly on the finger lifts to urge the follower and the clutch to operative position.

4. In a friction clutch, a male member and a female member, said female member comprising a base plate having an opening to receive the male member and an integral annular shell flaring upwardly from the edge of the plate opening, a contractible clutch element normally in the larger end of the shell and adapted to be wedged into the smaller end thereof between the shell and male member, a follower for operatively disposing the clutch resting on the latter and inclosing the upper edge of the shell, outwardly extending finger lifts on the follower, and a casing inclosing the follower and seating on the base plate, the lower edge of said casing having a plurality of depending lugs clenched against the under face of the plate, said casing having slots through which the finger lifts extend.

5. In a friction clutch, a male member and a female member, said female member comprising a base plate having an opening to receive the male member and an integral annular shell flaring upwardly from the edge of the plate opening, a contractible clutch element normally in the larger end of the shell and adapted to be wedged into the smaller end thereof between the shell and male member, a follower for operatively disposing the clutch resting on the latter and inclosing the upper edge of the shell, outwardly extending finger lifts on the follower, a casing inclosing the follower and seating on the base plate, and a spring seating on the finger lifts and bearing upwardly against the casing.

In testimony whereof I affix my signature.

JOHN SCHADE.

Witnesses:
WALTER H. O'BRIEN,
BERTHA L. ALLYN.

Copies of this patent may be obtained for five cents each, by addressing the "Commissioner of Patents, Washington, D. C."